(12) United States Patent
Hanna

(10) Patent No.: US 6,974,517 B2
(45) Date of Patent: Dec. 13, 2005

(54) LID WITH WINDOW HERMETICALLY SEALED TO FRAME, AND A METHOD OF MAKING IT

(75) Inventor: Mark B. Hanna, Allen, TX (US)

(73) Assignee: Raytheon Company, Waltham, MA (US)

( * ) Notice: Subject to any disclaimer, the term of this patent is extended or adjusted under 35 U.S.C. 154(b) by 251 days.

(21) Appl. No.: 09/880,365

(22) Filed: Jun. 13, 2001

(65) Prior Publication Data

US 2002/0192403 A1 Dec. 19, 2002

(51) Int. Cl.⁷ .............................................. C03C 27/04
(52) U.S. Cl. ..................... 156/109; 156/292; 438/116; 438/118; 438/121; 65/33.5; 65/33.6; 65/36; 65/59.1; 65/59.5
(58) Field of Search ................................. 65/33.5, 33.6, 65/36, 59.1, 59.5; 156/107–109, 292; 257/433, 434, 437, 680; 438/116, 118, 121; 428/34; 52/204.62; 250/330–334; 348/162, 164, 166–168

(56) References Cited

U.S. PATENT DOCUMENTS

| | | | |
|---|---|---|---|
| 2,065,404 A | | 12/1936 | Scott et al. |
| 2,708,774 A | * | 5/1955 | Seelen ........................... 428/34 |
| 2,768,475 A | * | 10/1956 | Seelen et al. .................. 29/447 |
| 3,589,881 A | * | 6/1971 | Langley et al. ................. 65/23 |
| 3,632,325 A | | 1/1972 | Evey .............................. 65/56 |
| 3,670,916 A | | 6/1972 | Alpert ......................... 220/9 F |
| 3,930,906 A | | 1/1976 | Irie et al. ..................... 148/113 |
| 3,957,538 A | | 5/1976 | Fairweather et al. ........ 136/133 |
| 4,135,789 A | * | 1/1979 | Hall ............................. 349/154 |
| 4,704,626 A | * | 11/1987 | Mahulikar et al. .......... 257/729 |
| 4,789,228 A | | 12/1988 | Le Pesant et al. .......... 350/355 |
| 4,812,420 A | * | 3/1989 | Matsuda et al. .............. 438/65 |

(Continued)

FOREIGN PATENT DOCUMENTS

| | | |
|---|---|---|
| DD | 244 332 A1 | 4/1987 |
| DE | G 90 03 394.9 | 8/1990 |
| DE | 195 02 006 A1 | 8/1996 |
| GB | 2184475 * | 6/1987 ............. E06B/3/54 |
| JP | 58161950 | 9/1983 |
| JP | 61036969 * | 2/1986 ........... H01L/27/14 |

OTHER PUBLICATIONS

Written translation of JP 61–36969 (of record).*
US 2001/0035496 A1, Hasegawa et al., filed Mar. 27, 2001, published Nov. 1, 2001.*
Sketch A, 1 sheet, prepared by Mark B. Hanna at least as early as Dec. 18, 2000.
International Preliminary Examination Report, 7 pages, Oct. 3, 2003.
U.S. Appl. No. 09/938,692, filed Aug. 23, 2001, now abandoned, entitled "Method and Apparatus for Controlling Emission of Radiation from a Housing, " by inventor Stephen Michael Shockey, 11 pages of text and 1 drawing sheet. (Attorney Docket No. 069078.0106, ET007).

(Continued)

Primary Examiner—Blaine Copenheaver
Assistant Examiner—Jessica Rossi
(74) Attorney, Agent, or Firm—Baker Botts L.L.P.

(57) ABSTRACT

An apparatus (10) includes a digital micromirror device (16) disposed within a housing (11) that has an opening (13) hermetically sealed by a lid (17). The lid includes a radiation transmissive window (22) with peripheral edges fixedly coupled by an annular sealing section (23) to a metal frame (21). The sealing section engages a frame surface oxidized in a wet nitrogen furnace. The sealing section melts at a temperature lower than the window or frame. The sealing section includes two center rings (151, 152) made of sealing glass that are respectively bonded to the window and frame and to each other. The sealing section also includes inner and outer rings (152, 157, 158) made of sealing glass and disposed on opposite sides of the center rings to protect the center rings from environmental factors.

12 Claims, 6 Drawing Sheets

U.S. PATENT DOCUMENTS

| | | | |
|---|---|---|---|
| 4,828,905 A | 5/1989 | Wada et al. ................. 428/213 |
| 4,988,157 A | 1/1991 | Jackel et al. |
| 5,061,049 A | 10/1991 | Hornbeck ................... 359/224 |
| 5,081,347 A * | 1/1992 | Matsumoto ................. 257/437 |
| 5,095,664 A | 3/1992 | Zayhowski .................. 51/283 |
| 5,122,862 A * | 6/1992 | Kajihara et al. ............. 257/704 |
| 5,175,611 A | 12/1992 | Richardson et al. ........ 257/699 |
| 5,264,393 A | 11/1993 | Tamura et al. .............. 437/209 |
| 5,293,511 A | 3/1994 | Poradish et al. |
| 5,352,852 A * | 10/1994 | Chun ........................ 174/52.4 |
| 5,392,155 A | 2/1995 | Tamari ....................... 359/558 |
| 5,510,215 A * | 4/1996 | Prince et al. .................. 430/7 |
| 5,528,100 A | 6/1996 | Igeta et al. ................. 313/477 |
| 5,650,915 A | 7/1997 | Alfaro et al. ............... 361/707 |
| 5,837,562 A * | 11/1998 | Cho ............................ 438/51 |
| 5,939,785 A | 8/1999 | Klonis et al. ............... 257/729 |
| 6,072,924 A | 6/2000 | Sato et al. .................... 385/18 |
| 6,154,305 A | 11/2000 | Dickensheets et al. ...... 359/225 |
| 6,172,457 B1 * | 1/2001 | Brown et al. ............... 313/496 |
| 6,261,867 B1 * | 7/2001 | Robichaud et al. ......... 438/118 |
| 6,265,076 B1 * | 7/2001 | McCurdy et al. ........... 428/432 |
| 6,461,537 B1 * | 10/2002 | Turcotte et al. ............. 252/194 |
| 6,513,214 B2 | 2/2003 | Nishimura et al. ........ 29/25.35 |
| 6,559,539 B2 * | 5/2003 | Tu et al. ..................... 257/723 |
| 6,582,531 B2 | 6/2003 | Warburton .................. 148/280 |
| 6,667,837 B1 | 12/2003 | Shockey ..................... 359/738 |
| 6,701,749 B2 * | 3/2004 | Wang et al. ................... 65/41 |
| 6,745,449 B2 | 6/2004 | Hanna et al. ................. 29/458 |
| 2001/0053016 A1 | 12/2001 | Nelson ....................... 359/291 |
| 2002/0192403 A1 | 12/2002 | Hanna .......................... 428/34 |
| 2003/0101562 A1 | 6/2003 | Hanna et al. ................. 29/412 |

OTHER PUBLICATIONS

U.S. Appl. No. 10/862,275, filed Jun. 7, 2004, entitled "Method and Apparatus For Making a Lid With an Optically Transmissive Window, " by inventor Mark B. Hanna, et al., 31 pages of text and 8 drawing sheets. (Attorney Docket No. 004578.1435.

U.S. Appl. No. 10/066,139, filed Jan. 30, 2002, entitled "Method and Apparatus For Configuring An Aperture Edge", by inventor Stephen Michael Shockey, 24 pages of text and 2 drawing sheets. (Attorney Docket No. 069078.0112).

U.S. Appl. No. 10/862,263, filed Jun. 7, 2004, entitled "Method and Apparatus For Making A Lid With An Optically Transmissive Window, " by inventor Mark B. Hanna, et al., 31 pages of text and 8 drawing sheets. (Attorney Docket No. 004578.1436.

U.S. Appl. No. 10/269,893, filed Oct. 10, 2002, entitled "Lid With A Thermally Protected Window, " by inventors Shea Chen, et al., 41 pages of text and 7 drawing sheets. (Attorney Docket No. 004578.1294).

International Preliminary Examination Report, 7 pages.

* cited by examiner

US 6,974,517 B2

LID WITH WINDOW HERMETICALLY SEALED TO FRAME, AND A METHOD OF MAKING IT

BACKGROUND OF THE INVENTION

An existing device includes a housing with an opening therein which is closed by a lid, the lid including a frame hermetically sealed to a window transmissive to radiation in a waveband of interest. The device can be used in a television or a projector to form images, which are typically projected onto some type of screen so that they can be viewed by a person. The device includes within the housing a digital micromirror device (DMD) of a known type. A beam of radiation enters the housing through the window in the lid, is processed by the digital micromirror device to form a plurality of sub-beams that represent an image, at least some of the sub-beams then exiting the housing through the window in order to facilitate the generation of the image which is projected onto the screen.

This existing lid is made by forming a metal frame which has an opening through it, placing a piece of glass in the opening through the frame, and heating the frame and glass until the peripheral edges of the glass become fused to the edges of the opening in the frame. While this existing lid and the process of making it have in generally adequate for their intended purposes, they have not been satisfactory in all respects.

In this regard, since the glass is fused to the frame by heating the glass to a temperature in the region of its melting point, various imperfections can be introduced into the glass, and these imperfections need to be subsequently polished out of the glass. A further consideration is that, in the existing type of device discussed above, a gas is provided within the housing in order to facilitate lubrication of the tiny movable mirrors of the DMD, but this gas also tends to be somewhat corrosive to other materials such as the metal of the frame, and thus the portions of the lid which are exposed to the gas must be resistant to its corrosive properties.

A further consideration is that, since the window is heated to temperatures that may produce imperfections which have to be subsequently polished out, certain steps in the fabrication process are carried out on a lid-by-lid basis after the window of each lid has been fused to the frame, and after any resulting imperfections have been polished out. For example, in some applications it is desirable to have an anti-reflective coating on one or both sides of the window, and each such coating is applied on a lid-by-lid basis after the window has been fused to the frame and after any resulting imperfections in the window have been polished out.

SUMMARY OF THE INVENTION

From the foregoing, it may be appreciated that a need has arisen for improvements to an apparatus having a window sealed to a frame, and to a method for making such an apparatus. According to a first form of the present invention, a method is provided and involves: providing a window which is transmissive to radiation having a predetermined wavelength; providing a frame which has an opening therethrough; providing an annular sealing section between and in contact with each of the window and the frame, the sealing section extending completely around the opening; heating the window, the frame and the sealing section to a selected temperature at which the sealing section has melted, the selected temperature being lower than melting temperatures of the frame and the window; and thereafter cooling the window, the frame and the sealing section until the sealing section has solidified and formed between the window and the frame a hermetic seal which extends completely around the opening.

According to a different form of the present invention, an apparatus is provided, and includes a window which is transmissive to radiation having a predetermined wavelength; a frame which has an opening therethrough; and an annular sealing section which is disposed between and fixedly bonds the window to the frame. The sealing section extends completely around the opening and provides a hermetic seal between the window and the frame at all locations therealong, and is configured to melt at a temperature which is lower than melting temperatures of the frame and the window.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
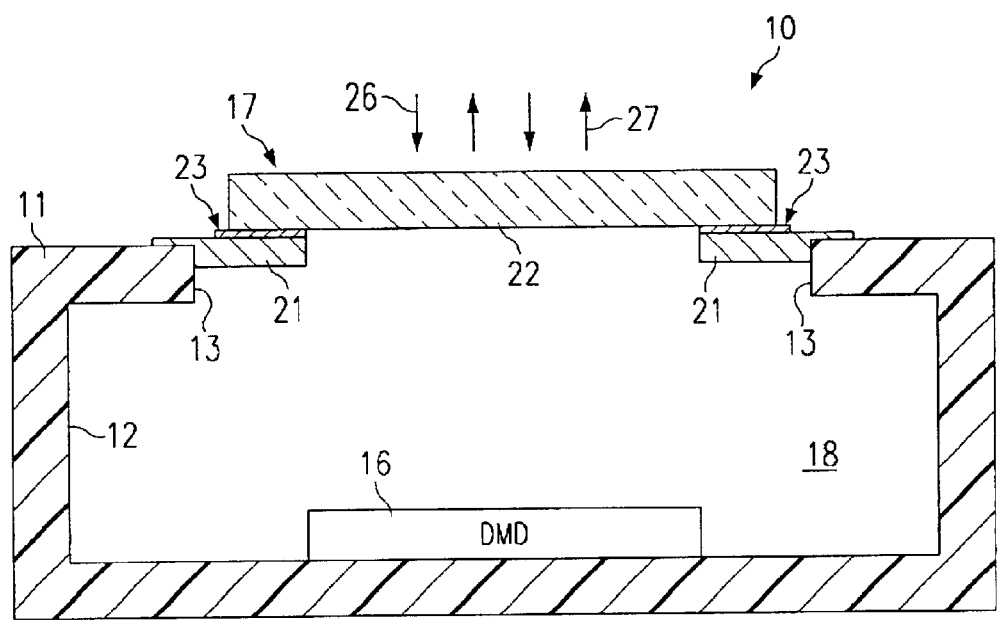
FIG. 1 is a diagrammatic sectional side view of an apparatus that includes a housing with an opening which is closed by a lid embodying aspects of the present invention.

FIG. 1 is a diagrammatic sectional side view of an apparatus 10 which embodies aspects of present invention.

The apparatus 10 includes a housing 11 which has a chamber 12 therein, and which has a top wall with a vertical opening 13 through it. A digital micromirror device (DMD) 16 of a known type is supported within the chamber 12, in the center of the top surface of the bottom wall of the housing 11. The DMD 16 has on an upper side thereof a two-dimensional array of tiny reflective mirrors, which each correspond to a respective pixel of an image, and which can each be independently physically moved by the DMD 16 in response to electrical control signals.

A lid 17 is provided on top of the housing 11, so as to seal the opening 13. The peripheral edges of the lid 17 are seam welded in a known manner to the top surface of the housing 11. The lid 17 effects a hermetic seal between the interior and exterior of the housing 11. A gas is provided in the region 18 within the chamber 12, and the lid 17 ensures that this gas does not escape from the chamber 12 in the housing 11. The gas serves to lubricate the mirrors of the two-dimensional array on the DMD 16, in order to facilitate their movement and ensure that they have a relatively long operational lifetime. However, this gas also is somewhat corrosive, and the housing 11 and lid 17 of the disclosed embodiment are thus resistant to corrosive damage from the gas.

The lid 17 is discussed in more detail later, but a brief initial description is given here. In particular, the lid 17 includes an annular metal frame 21, a window 22 which is substantially transparent to radiation within a selected range of wavelengths, and an annular sealing section 23 which is provided between the frame 21 and the peripheral edges of the window 22. In the disclosed embodiment, the sealing section 23 includes several different portions which are not separately shown in FIG. 1, but which are each described later. Also, in the disclosed embodiment, the window 22 is transmissive to a range of wavelengths centered approximately around a wavelength of 545 nm, and in particular a range of approximately 420 nm to approximately 700 nm. However, the window could be transmissive to some other range of wavelengths.

A beam of inbound radiation, indicated diagrammatically by two arrows 26 in FIG. 1, passes through the window 22 and travels to the DMD 16, where each of the mirrors of the DMD 16 reflects a respective portion of the beam in a respective direction determined by the current physical position of that mirror. The various independently reflected portions of the original beam are each referred to here as a sub-beam. The plurality of reflected sub-beams then travel away from the DMD 16 in various different directions, and at least some of them will travel back out through the window 22, as indicated diagrammatically by two arrows 27. For simplicity, the arrows representing inbound radiation 26 and outbound radiation 27 are shown as vertical lines in FIG. 1, but it will be recognized that various different beams and sub-beams would typically be traveling in various different directions.

Figure 2:
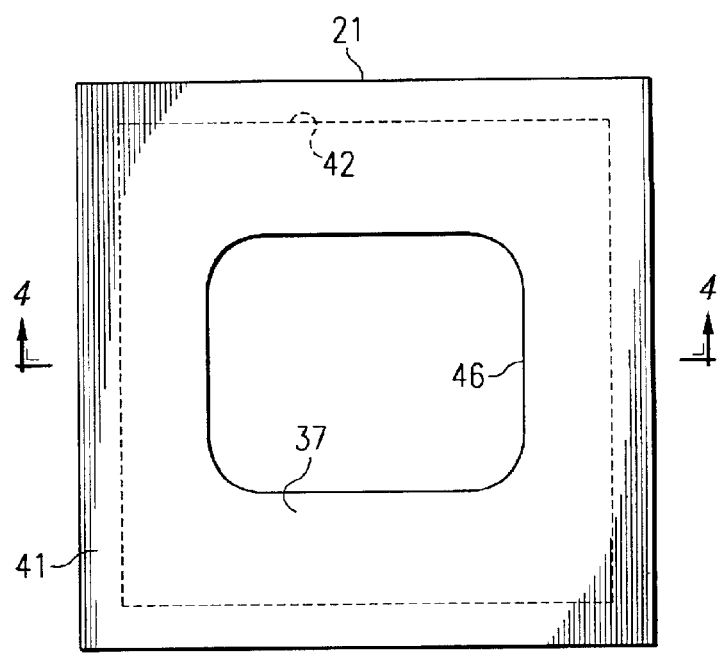
FIG. 2 is a diagrammatic top view of a frame which is a component of the lid of FIG. 1.
Figure 3:
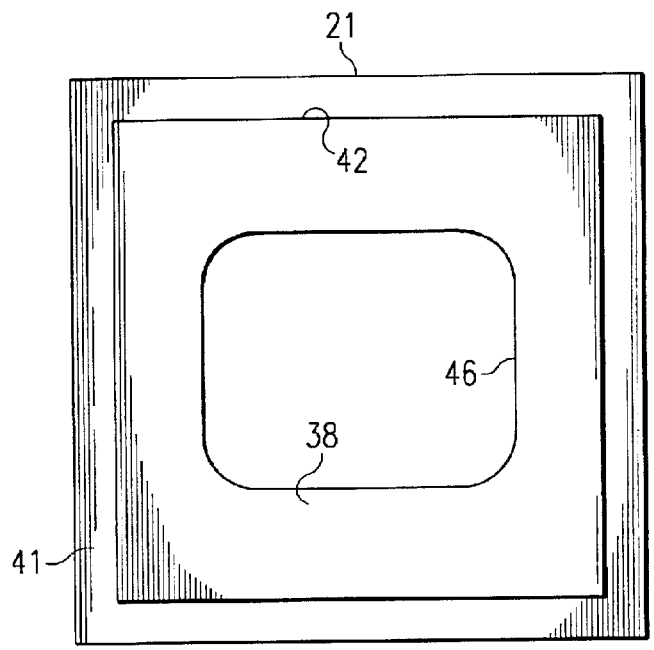
FIG. 3 is a diagrammatic bottom view of the frame of FIG. 2.
Figure 4:
FIG. 4 is a diagrammatic sectional side view of the frame, taken along the line 4—4 in FIG. 2.

The frame 21 will now be described in more detail. In this regard, FIG. 2 is a diagrammatic top view of the frame 21, FIG. 3 is a diagrammatic bottom view of the frame, and FIG. 4 is a diagrammatic sectional side view of the frame, taken along the line 4—4 in FIG. 2. The frame 21 in the disclosed embodiment is made from steel, for example of the specific type that is readily commercially available from a number of vendors as ASTM-F15. The frame 21 is a plate-like element and, as best seen in FIGS. 2 and 3, has an outer edge with the shape of a square. As shown in FIG. 4, the frame 21 has a planar top surface 37 and a planar bottom surface 38, the top and bottom surfaces 37 and 38 being parallel to each other. The frame 21 has in its underside an annular recess of rectangular cross section, which extends along the entire peripheral edge of the frame, so as to define an outwardly projecting annular flange 41 of uniform width and thickness along the entire periphery of the frame. The flange 41 can be formed in any suitable and convenient manner, for example by a fine blanking technique or a stamping technique. Immediately below the flange 41, at the inner end thereof, is an outwardly facing annular surface 42. The frame 21 has a central opening 46 extending vertically therethrough, the opening 46 having a generally rectangular shape, except that the corners are rounded.

Figure 5:
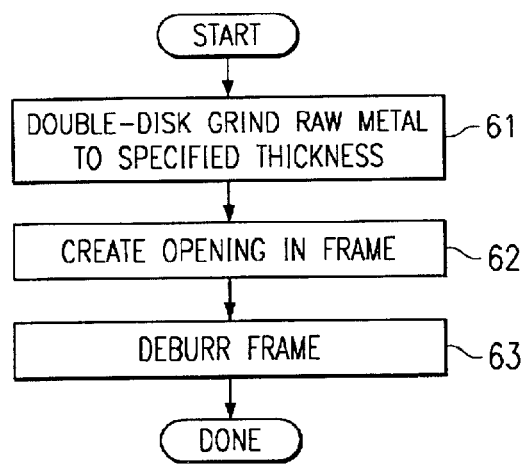
FIG. 5 is a flowchart showing a sequence of operations which embodies aspects of the present invention and which can be used to make a frame of the type shown in FIGS. 2–4.

FIG. 5 is a flowchart showing a sequence of steps which are carried out to make the frame 21 of the disclosed embodiment. As noted above, the frame 21 of the disclosed embodiment is made from commercially available ASTM-F15 steel material. At block 61, this raw metal material is double disk ground to a selected uniform thickness, which in the disclosed embodiment is 0.030 inches. Next, at block 62, the opening 46 is created in the center of the frame by coining or fine-blanking the metal material. Then, at block 63, the frame is deburred using known techniques.

Figure 6:
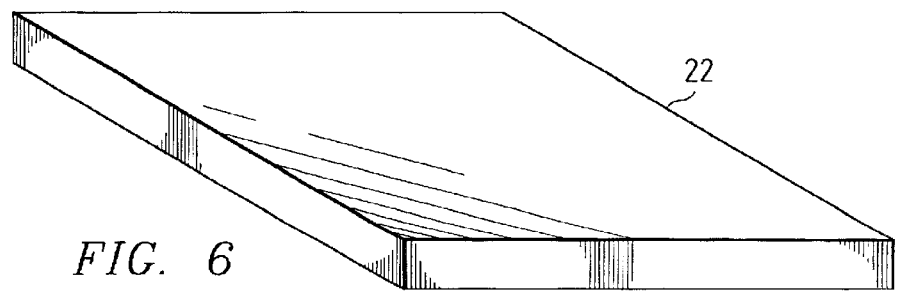
FIG. 6 is a diagrammatic perspective view of a window which a component of the lid of FIG. 1.

The window 22 (FIG. 1) of the lid 17 will now be described in greater detail. In this regard, FIG. 6 is a diagrammatic perspective view of the window 22. It will be noted from FIG. 6 that the window 22 is a plate-like element having parallel top and bottom surfaces, with an outer edge which forms the shape of a square. The window 22 of the disclosed embodiment is made from a borosilicate glass material, which in the disclosed embodiment is commercially available as catalog number 7056 from Corning Incorporated of Danville, Va.

This particular glass material is transmissive to radiation in a range which is centered at a wavelength of about 545 nm, and which extends from approximately 420 nm to about 700 nm. Further, this particular glass material has an index of refraction of approximately 1.47 to 1.50 for radiation at the wavelength of about 545 nm. However, it would alternatively be possible to use a different glass material which is tranmissive to radiation in a different range of wavelengths, and/or which has a different index of refraction for radiation within the range of interest. The window 22 has on each of the top and bottom surfaces thereof an anti-reflective (AR) coating. However, these coatings are relatively thin and, for clarity, are not shown in FIGS. 1 and 6. The AR coatings in the disclosed embodiment are silicon oxide, but could alternatively be some other suitable material, such as magnesium fluoride.

Figure 7:
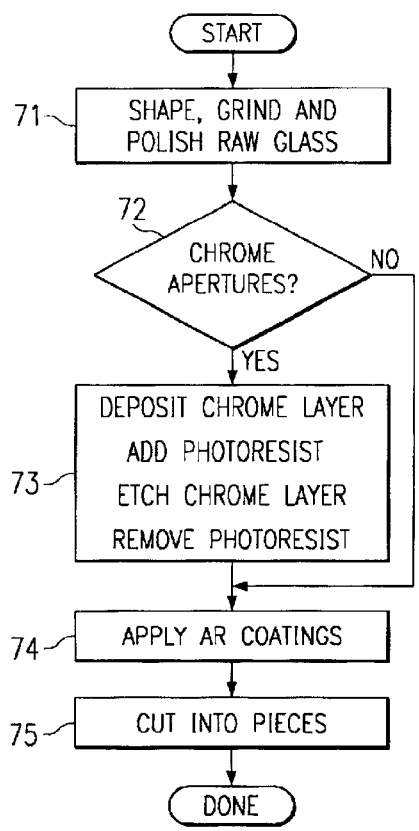
FIG. 7 is a flowchart showing a sequence of operations which embodies aspects of the present invention and which can be used to make a window of the type shown in FIG. 6.
Figure 8:
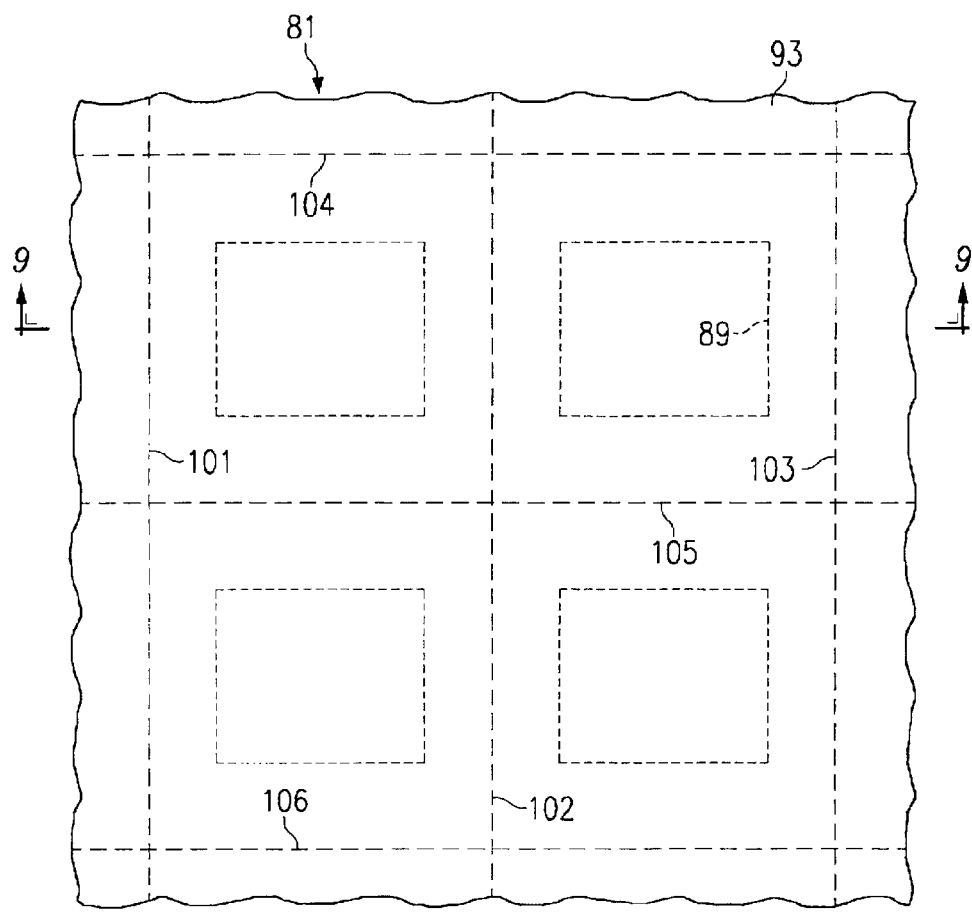
FIG. 8 is a diagrammatic fragmentary top view of a large sheet of glass material which is subjected to certain processing steps, and which is then cut into smaller pieces that each serve as a respective window of the type shown in FIG. 6.
Figure 9:
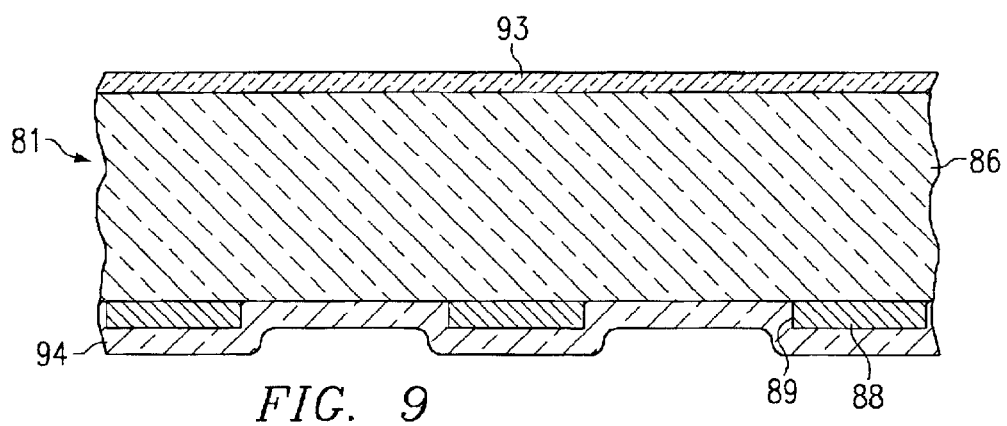
FIG. 9 is a diagrammatic fragmentary sectional side view taken along the line 9—9 in FIG. 8.

FIG. 7 is a flowchart showing a sequence of steps 71-75 used in the disclosed embodiment to fabricate the window 22. At block 71, the raw glass material is shaped, ground and polished. These operations are carried out on a sheet of the glass material which is significantly larger than a single window 22, and which is eventually cut to form several of the windows 22, as discussed below. In this regard, FIG. 8 is a diagrammatic fragmentary top view of a multi-layer structure 81 which includes a large sheet of a glass material such as the above-mentioned Corning 7056, and which will eventually be cut to yield several windows of the type shown at 22 in FIG. 1. FIG. 9 is a diagrammatic fragmentary sectional side view taken along the line 9—9 in FIG. 8.

With reference to FIG. 9, layer 86 is the large sheet of glass material mentioned above, which in the disclosed embodiment is a borosilicate glass such as Corning 7056. This raw glass material is heated for approximately 16 hours at a temperature which is increased progressively from an ambient temperature of about 25° C. to a temperature of about 1050° C. The heated glass material is then pressed and/or formed so that it has an appropriate length, width and thickness, which may be referred to as a "near net shape". In the disclosed embodiment, this near net shape is 6 inches long by 6 inches wide by 0.155 inches thick. The glass sheet is then cooled gradually back to 25° C. Next, this glass sheet is ground and polished to specified optical criteria. In the disclosed embodiment, the specified optical criteria are that both the top and bottom surfaces of the layer 86 are polished to a flatness of 4 fringes spherical power and 2 fringes irregularity.

Referring again to FIG. 7, a decision is then made at block 72 regarding whether or not to carry out an optional step, which is the formation on one side of the layer 86 of a chrome layer having apertures. If this chrome layer is to be included, then block 73 is carried out, whereas block 73 is skipped if the chrome layer is to be omitted.

In block 73, a layer of chrome is deposited in a known manner on one side of the glass sheet 86, the chrome layer being indicated at 88 in FIG. 9. A not-illustrated layer of a standard photoresist material is then deposited using known techniques in a pattern which covers portions of the chrome layer other than regions that are to be etched away to form apertures through the chrome layer. An etching procedure of a known type is then carried out in order to etch away the exposed chrome material, so as to form apertures 89 (FIGS. 8 and 9) through the chrome layer 88. As evident from FIG. 8, the apertures 89 in the chrome layer each have a rectangular shape. The purpose of the optional chrome layer 88 with the apertures 89 will be discussed later. After the apertures 89 have been etched through the chrome layer 88, the not-illustrated photoresist layer is removed using known techniques.

Next, with reference to block 74 in FIG. 7, an antireflective (AR) coating is applied to each side of the structure. These coatings are shown at 93 and 94 in FIG. 9. As mentioned above, both of these coatings are silicon oxide in the disclosed embodiment, but could alternatively be some other suitable material, such as magnesium fluoride. The thickness of the coatings 93–94 is selected so that the coatings 93–94 collectively effect an average transmittance of at least 98% across the wavelength range of interest, which in the disclosed embodiment includes wavelengths in the range of 420 nm to 700 nm. After application of the coatings 92–94, the result is the multi-layer structure shown at 81 in FIGS. 8–9.

Next, with reference to block 75 in FIG. 7, a not-illustrated diamond wheel saw of a known type is used to cut the multi-layer structure 81 into a plurality of pieces which each serve as a respective window of the type shown at 22 in FIG. 1. This cutting of the multi-layer structure 81 is carried out by cutting it along each of a first group of parallel lines, some of which are indicated diagrammatically by broken lines at 101–103 in FIG. 8, and by then cutting it along each of a second group of parallel lines that extend perpendicular to the first group, some of which are indicated diagrammatically by broken lines at 104–106 in FIG. 8.

As mentioned above, the chrome layer 88 with the apertures 89 (FIGS. 8–9) is present in some embodiments of the present invention and omitted from other embodiments. For purposes of clarity in describing the present invention, the windows 22 discussed above in association with FIGS. 1 and 6 do not include the chrome layer 88.

Figure 10:
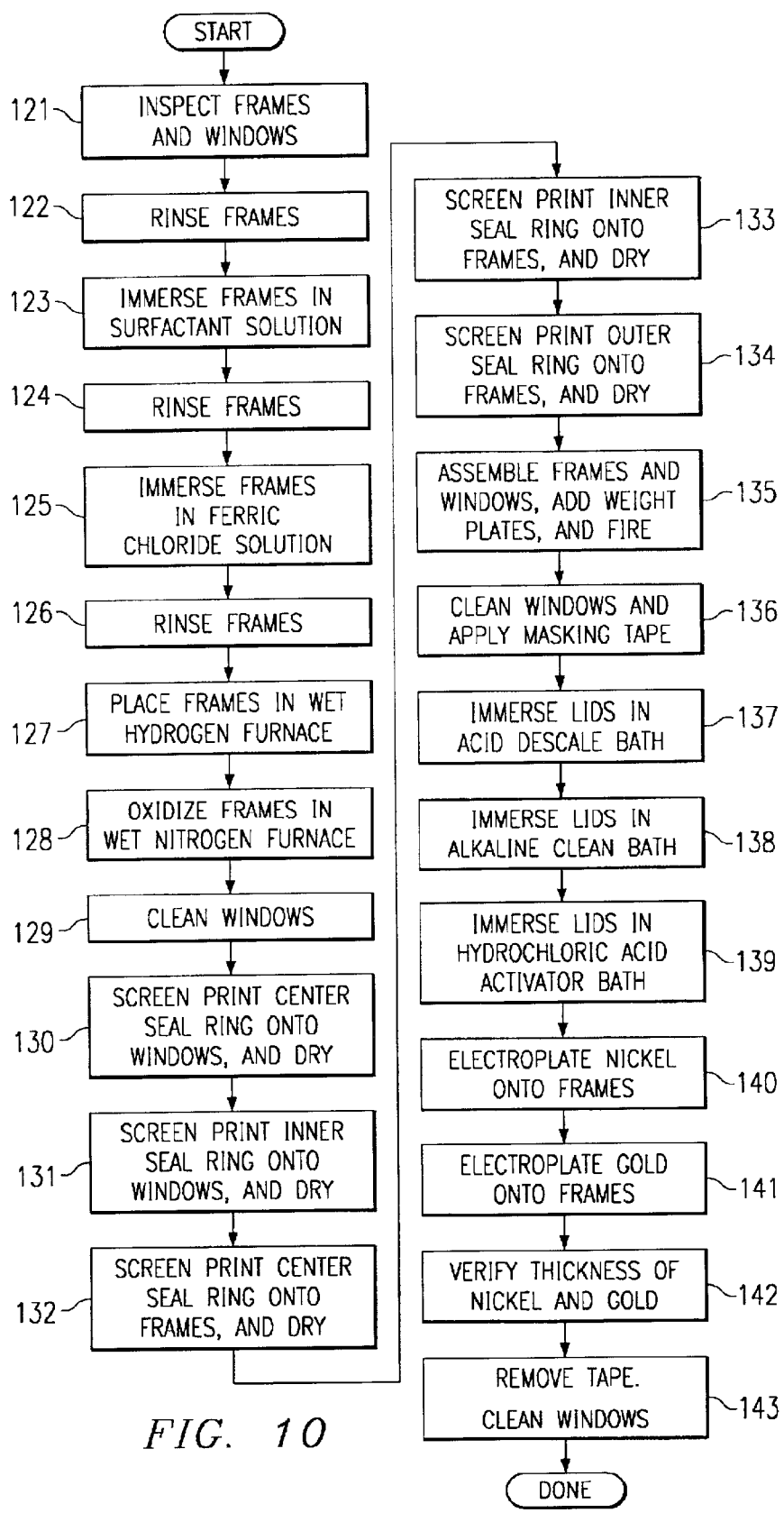
FIG. 10 is a flowchart showing a sequence of operations which embodies aspects of the present invention and which can be used in assembling a lid of the type shown in FIG. 1.

FIG. 10 is a flowchart which shows a sequence of steps 121–143 that are carried out in the disclosed embodiment in order to assemble the lid 17 (FIG. 1). In block 121, a sample subset of the frames made according to the procedure of FIG. 5 is subjected to inspection, and a sample subset of the windows made according to the procedure of FIG. 7 is subjected to inspection. In the disclosed embodiment, the inspection of the frames and the inspection of the windows are each carried out so as to obtain a 1% acceptable quality level (AQL), which is an industry standard technique where a table is used to determine the number of parts that need to be inspected in order to assure a specified quality level. The remainder of the flowchart of FIG. 10 deals with frames and windows that have passed the inspection procedure.

More specifically, in block 122, frames are loaded into a suitable support rack, and are then rinsed in deionized water. Next, at block 123, the frames are immersed in a surfactant solution (soap solution) at a temperature of approximately 60° C. for a time interval in the range of approximately 9.5 to 10.5 minutes. The rack and frames are then removed from this solution. Next, at block 124, the rack and frames are rinsed with room temperature deionized water.

Then, at block 125, the rack and frames are immersed in a room temperature ferric chloride solution for a time interval in the range of approximately 1.5 to 2.5 minutes. The rack and frames are then removed from this solution and allowed to drain. Then, at block 124, the rack and frames are rinsed with room temperature deionized water.

Next, at block 127, the frames are transferred from the rack to a ceramic plate, and are processed in a wet hydrogen furnace while maintaining a heat temperature of approximately 1050° C. for a time interval of the range of approximately 11 to 15 minutes. This serves to remove carbon, oxygen and sulfur impurities from the frames, along with other trapped contaminates, through the formation of products such as $CH_4$, $CO_2$ and $CO+H_2$. Next, at block 128, the frames are transferred to a different set of ceramic plates, and are then oxidized by processing them in a wet nitrogen furnace while maintaining a peak temperature of approximately 895° C. to 1005° C. for a time interval of approximately 9 to 13 minutes. The layer of oxidation formed on the frames in the disclosed embodiment will be dark gray in color, and will have a thickness in the range of approximately 3 to 10 Å.

Figure 11:
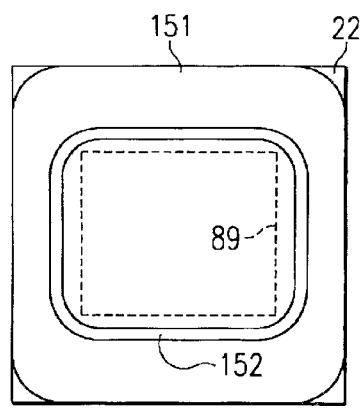
FIG. 11 is a diagrammatic bottom view of the window of FIG. 6, showing two seal rings applied to a bottom surface thereof.

Then, at block 129, each of the windows 22 is cleaned, using a lint-free cloth and isopropyl alcohol. Next, with reference to block 130, a center seal ring is screen printed onto each window 22. FIG. 11 is a diagrammatic bottom view of the window 22, showing this center seal ring 151 thereon. The center seal ring 151 is a portion of the seal section indicated at 23 in FIG. 1. The center ring 151 is made from a commercially available sealing glass, which in the disclosed embodiment is a material available commercially as catalog number ESL-4026 from Electro Science Laboratories in King of Prussia, Pa. This sealing glass material, as commercially marketed, is in the form of a paste that is directly suitable for application to the window 22 through screening printing.

As evident from FIG. 11, the outer edge of the ring 151 has approximately a square shape, and in particular conforms in size and shape to the outer edge of the window 22, except that the four outer corners of the seal ring 151 are rounded. The inner edge of the seal ring 151 defines an approximately rectangular opening, except that the corners are rounded. The material of the seal ring 151 has a melting temperature which is lower than the melting temperature of the glass material forming the window 22, and lower than the melting temperature of the metal material of the frame 21. After the center ring 151 has been screen printed onto the underside of the window 22, the window 22 with the ring thereon are dried at a temperature of approximately 150° C. for a time interval in a range of 10 to 20 minutes. The application and subsequent drying of the ring 151 correspond to block 130 in FIG. 10.

Next, in block 131 of FIG. 10, an inner seal ring is screen printed onto each of the windows 22, and is then dried. With reference to FIG. 11, this inner seal ring is shown at 152. The outer edge of the seal ring 152 has the same size and shape as the inner edge of the seal ring 151, and engage the inner edge of the seal ring 151. The inner edge of the seal ring 152 defines an approximately rectangular shape, except that the corners are rounded. The inner edge of the seal ring 152 is identical in both size and shape to the edge of the opening 46 (FIG. 2) through the metal frame 21.

The inner seal ring 152 is also a sealing glass, but is made from a material different from the material of the ring 151. In the disclosed embodiment, the ring 152 is a sealing glass which is available commercially as catalog number E96919-74A from Dupont Electronics of Research Triangle Park, N.C. The sealing glass used for the seal ring 152 has a melting temperature which is less than the melting temperature of the Corning 7056 glass used for the window 22, and less than the melting temperature of the metal material used for the frame 21. Further, the sealing glass used for seal ring 152 is marketed in a paste form that is directly suitable for screen printing of the seal ring 152 onto the underside of the window 22. After the inner seal ring 152 has been applied to the underside of the window 22, it is dried at 150° C. for a time interval in the range of 10 to 20 minutes.

As mentioned above, it is being assumed for purposes of discussion that the window 22 in FIG. 11 does not include the chrome layer 88 with one of the apertures 89 therein (FIGS. 8–9), but if it did include the chrome layer 88 with an aperture 89, the aperture 89 would have the size, shape and location indicated by broken lines at 89 in FIG. 11. It will be noted from FIG. 11 that the center ring 151 has, all along its length, a width which is more than twice the width of the inner seal ring 152.

Figure 12:
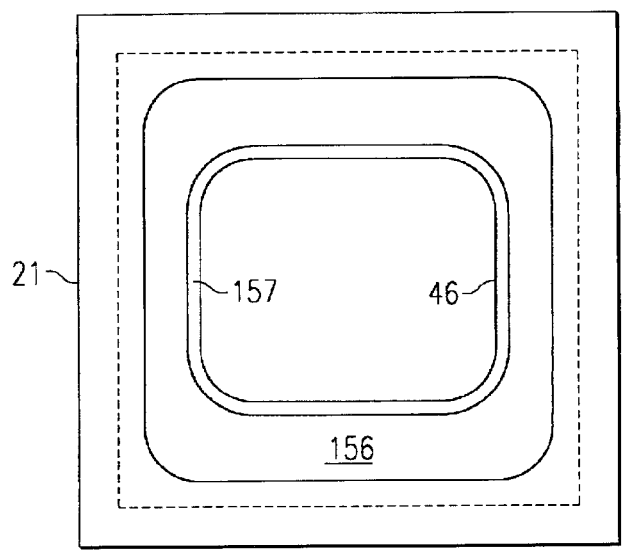
FIG. 12 is a diagrammatic top view of the frame of FIGS. 2–4, showing two seal rings applied to a top surface thereof.

Next, at block 132 in FIG. 10, a center seal ring is screen printed onto each of the frames 21, and is then dried. More specifically, FIG. 12 is a diagrammatic top view of the frame 21, and shows at 156 the center seal ring which is formed thereon. The center seal ring 156 is identical in size and shape to the center seal ring 151 formed on the window 22. However, the center seal ring 156 is made from a sealing glass material that is different from the sealing glass material used for the center seal ring 151 on the window 22. In particular, in the disclosed embodiment, the center seal ring 156 on the frame 21 is made from a sealing glass material which is commercially available as catalog number ESL-4035 from Electro Science Laboratories. This sealing glass material has a melting temperature which is less than the melting temperature of the Corning 7056 glass used for window 22, and less than the melting temperature of the metal material used for the frame 21. Further, the sealing glass used for seal ring 156 is sold in a paste form that is directly suitable for screen printing the seal ring 156 onto the top surface of the frame 21. After the center seal ring 156 has been applied to the top surface of frame 21, it is dried at 150° C. for a time interval in the range of 10 to 20 minutes.

Next, at block 133, an inner seal ring is screen printed onto a each of the frames and then dried. In more detail, this inner seal ring is shown at 157 in FIG. 12. It is identical in size and shape to the inner seal ring 152 provided on the window 22 in FIG. 11, and is made from the same material. The inner edge of the seal ring 157 conforms closely to the inner edge of the opening 46 in the frame 21. After the inner seal ring 157 has been applied to the frame 21, it is dried at 150° C. for a time interval in the range of 10 to 20 minutes.

Figure 13:
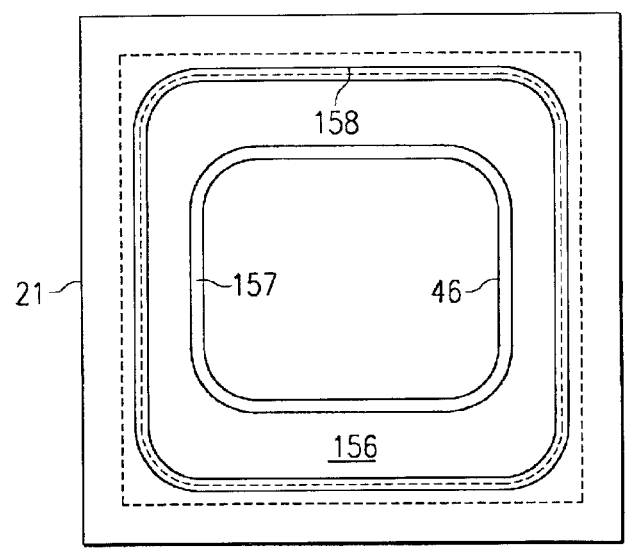
FIG. 13 is a diagrammatic top view similar to FIG. 12, but showing the addition of a third seal ring to the top of the frame.

Next, at block 134 in FIG. 10, an outer seal ring is screen printed onto each of the frames, and is then dried. In more detail, FIG. 13 is a diagrammatic top view similar to FIG. 12, except that it also shows the outer seal ring 158. The outer seal ring 158 is made from the same material as the inner seal rings 152 and 157. The inner and outer edges of the outer seal ring 158 each define approximately a square shape, except that the corners are rounded. The inner half of the outer seal ring 158 overlaps the outer edge portion of the center seal ring 156, and the outer half of the seal ring 158 is disposed outwardly of the outer edge of the center seal ring 156. The outer seal ring 158 has a width which is approximately the same as the width of the inner seal ring 157, and thus the width of the center seal ring 156 is at least twice the width of the outer seal ring 158 at all locations along the lengths thereof. After the outer seal ring 158 has been applied, it is dried at a temperature of 150° C. for a time interval in the range of 10 to 20 minutes.

Figure 14:
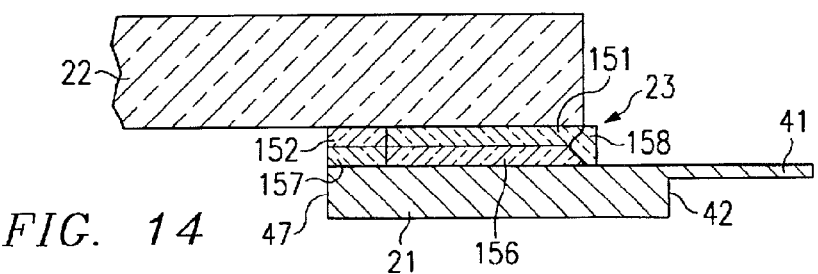
FIG. 14 is a diagrammatic fragmentary sectional side view of a portion of the lid of FIG. 1, shown in a larger scale than in FIG. 1.

Next, and with reference to block 135 in FIG. 10, each of the windows 22 is placed onto a respective one of the frames 21 in alignment therewith, so that the center and inner rings 151–152 (FIG. 11) on the window 22 are respectively aligned with and engage the center and inner rings 156–157 (FIG. 13) on the frame 21. FIG. 14 is a diagrammatic fragmentary sectional side view showing this alignment between the window 22, the frame 21, and the seal rings 151–152 and 156–158. The seal rings 151–152 and 156–158 serve as respective portions of the sealing section shown at 23 in FIGS. 1 and 14. Each frame 21 with a window 22 thereon is placed on a graphite fixture, and a weight plate is added to urge each window toward the associated frame. These assemblies are then fired in an air atmosphere at approximately 600° C. for approximately one hour and ten minutes. This temperature is above the melting point of each of the sealing glasses 151–152 and 156–158 that form the sealing section 23, but is below the melting temperature of the metal frame 21, and is sufficiently below the melting temperature of the glass material of the window 22 so that the optical properties of the window 22 are not affected. Consequently, each of the sealing glasses in the sealing section 23 melts or softens sufficiently so that, when the frame and window assemblies are subsequently cooled back to room temperature, the seal rings in the sealing section 23 not only serve to fixedly secure the window 22 to the frame 21, but also provide a hermetic seal between the window 22 and the frame 21. In this regard, the material of the center seal ring 151 is selected because it will bond securely to the surface of the material of the window 22, and the material of the center seal ring 156 is selected because it will bond securely to the oxidized surface of the metal frame 21. Further, the materials of the center seal ring 151 and 156 bond securely to each other.

As mentioned above in association with FIG. 1, the chamber 12 within the housing 11 contains at 18 a lubricant gas which is corrosive. The material of the inner seal rings 152 and 157 is selected because it is substantially impervious to damage from this corrosive gas. Thus, the inner seal rings 152 and 157 cooperate to define an inner seal which extends between each of the frame 21 and window 22, and which protects the material of both of the center seal rings 151 and 156 from damage caused by the corrosive characteristics of the lubricant gas. The outer seal ring 158 is also provided to protect the center seal rings 151 and 152, for example from acidic solutions used during subsequent processing of the frame 21, as discussed below.

More specifically, with reference to block 136 in FIG. 10, the weights are removed from the assemblies, and the assemblies are removed from the graphite fixtures. The window 22 of each assembly is then cleaned with a lint-free cloth and isopropyl alcohol. Then, plating masking tape of an industry standard type is applied to both sides of the window 22, so as to completely cover both sides thereof.

Next, with reference to blocks 137–139 in FIG. 10, the lid assemblies with the masking tape on the windows are placed in suitable racks, and then immersed successively in an acid descale bath (block 137) an alkaline clean bath (block 138), and a hydrochloric acid bath (block 139). These baths serve to prepare the exposed surfaces of the frame 21 for plating, including removal of the oxidation that was formed on the frame 21 at block 128 in FIG. 10. As discussed above, the purpose of the oxidation was to provide a surface on the frame 21 which would ensure a secure bond between the center seal ring 156 and the frame 21. As to other surface portions of the frame 21, which are not engaged by the seal section 123, it is appropriate to remove the oxidation from these surface portions in order to facilitate plating thereof. It should be kept in mind that, as mentioned above, the inner seal rings 152 and 157 and the outer seal ring 158 serve to protect the center seal rings 151 and 156 from the acidic solutions used in steps 137 and 139 to prepare the frame 21 for plating.

Next, at step 140, the exposed surfaces of the frame 21 are electroplated with a layer of nickel having a thickness of 100–300$\mu$ inches. Then at block 141, a layer of gold is electroplated onto the layer of nickel, the gold layer having a thickness of at least 50$\mu$ inches. The gold and nickel layers help to protect the ASTM-F15 steel material of the frame 21 from damage due to environmental factors, such as the corrosive characteristics of the lubricant gas disposed within the chamber 12 in the housing 11.

Next, at block 142, the thickness of the nickel and gold layers is verified by an x-ray florescence (XRF) measurement, using techniques which are known in the art. In the disclosed embodiment, this XRF measurement is carried out on a subset of the assemblies, for example two assemblies selected randomly from each plating rack.

Next, at block 143, the plating masking tape is taken off each of the windows 22. Then, each of the windows 22 is cleaned with a lint-free cloth and isopropyl alcohol. In occasional situations where residue from the plating masking tape is resistant to removal by the isopropyl alcohol, acetone may optionally be used with a lint-free cloth to remove the tape residue. After cleaning of the windows 22 in block 143, the resulting assemblies are each a lid of the type shown at 17 in FIG. 1.

As discussed above in association with FIGS. 8 and 11, it is possible to provide on one side of the window 22 an optional chrome layer 88 with a rectangular aperture 89 therein. Whether or not this chrome layer is present can depend on the intended use of the apparatus 10 of FIG. 1. For example, the apparatus 10 may be used to form an image in a large-screen television, where the image will be projected onto the rear of a screen supported in a television housing. In this situation, the housing of the television will serve as a form of frame that truncates the outermost peripheral edges of the image. Consequently, it is not particularly critical whether the outermost edges of the radiation transmitted to the screen are a little uneven, because they will not be visible to the viewer.

On the other hand, the apparatus 10 of FIG. 1 can alternatively be used to form images in a projector of the type that is coupled to a computer and used to transmit to a remote screen an image equivalent to the image displayed on the monitor of the computer. For example, a professor giving a lecture to a large class in a lecture hall might use such a projector so that all students can clearly and easily see what is happening on a computer screen. In this situation, if the image transmitted to the screen had uneven edges, the uneven edges would be clearly visible to a viewer. To avoid this, the chrome layer 88 with the aperture 89 is provided, and the chrome layer 88 truncates the outermost peripheral edges of the image information traveling away from the DMD 16. Consequently, the image which is projected onto the remote screen has edges that form a very precise rectangle corresponding to the edges of the aperture 89 in the chrome layer 88. Since the aperture 89 in the chrome layer is formed using a photoresist and etching techniques of the type developed for use in manufacturing tiny integrated circuits, the edges of the aperture 89 can be formed with a high level of precision. Therefore, they will not appear to be uneven or ragged even when magnified many times for purposes of projection onto a very large screen.

The present invention provides a number of technical advantages. One such technical advantage is that several steps in the fabrication process can be carried out on a relatively large sheet of glass before it is cut up to form individual windows. This includes the application of a reflective coating to each side of the glass sheet. This also includes the deposition and patterned etching of the chrome layer with apertures, in the embodiment where this layer is provided. The ability to carry out these steps on a large sheet of glass rather than on individual windows provides efficiencies that can reduce the cost of making the windows by 30% to 50% over preexisting techniques.

A further advantage results from the fact that each of the materials in the sealing section has a melting temperature which is lower than the melting temperatures of the glass material forming the window and the metal forming the frame. This permits the window to be securely and hermetically sealed to the frame without heating the window to a temperature that introduces imperfections into the window which would have to be polished out. Still another advantage results from configuration of the sealing section as various different portions that are made of different materials. In this regard, the center seal rings provide secure bonds to each other and to the materials of the window and frame. The inner and outer seal rings protect the center seal rings from environmental factors, during certain steps of the fabrication process and/or during subsequent use of the resulting lids.

Still another advantage results from the fact that the oxidation of the frames is carried out by processing the frames in a wet nitrogen furnace. The oxidation produced on the frames by this technique facilitates a more secure bond between the frame and the sealing section than the oxidation resulting from other techniques, such as oxidation using air without water.

Although selected embodiments have been illustrated and described in detail, it will be understood that various substitutions and alterations can be made therein without departing from the spirit and scope of the present invention, as defined by the following claims.

What is claimed is:

1. A method for providing a hermetic seal between a window and a frame of an apparatus, comprising the steps of:

providing a window which is transmissive to radiation having a predetermined wavelength;

providing a frame which has an opening therethrough;

providing an annular sealing section between and in contact with each of said window and said frame, said sealing section extending completely around said opening;

heating said window, said frame and said sealing section to a selected temperature at which said sealing section has melted, said selected temperature being lower than melting temperatures of said frame and said window; and thereafter cooling said window, said frame and said sealing section until said sealing section has solidified and formed between said window and said frame a hermetic seal which extends completely around said opening;

selecting for use in said sealing section a first glass material and a second glass material made from a material different from a material of the first glass material, said first glass material being an annular portion of said sealing section which extends around said opening of said frame in contact with said window and spaced from said frame, said second glass material being an annular portion of said sealing section which extends around said opening of said frame in contact with said frame and spaced from said window, and said first and second glass materials being in contact with each other between said window and frame;

selecting for use in said sealing section a third glass material made from a material different from each of said first and second glass materials, and which is an annular portion of said sealing section that extends around said opening of said frame in contact with each of said frame and said window, said third glass material being disposed on a side of said first and second glass materials nearest said opening in said frame.

2. A method according to claim 1, including the step of selecting for use in said sealing section a fourth glass material made from a material different from each of said first and second glass materials, and which is an annular portion of said sealing section that extends around said opening of said frame in contact with each of said frame of said window, said fourth glass material being disposed on a side of said first and second glass materials remote from said opening in said frame.

3. A method according to claim 1, wherein the apparatus includes a digital mirror device.

4. A method according to claim 1, including the step of selecting for use in said window a material which includes a borosilicate glass.

5. A method according to claim 1, wherein said step of providing said window includes the step of forming an antireflective coating on a side of said window that will face said frame and be in contact with said sealing section.

6. A method according to claim 5, wherein said antireflective coating is one of silicon oxide and magnesium fluoride.

7. A method according to claim 1, wherein said step of providing said frame includes the steps of:

using a metal to make said frame; and oxidizing a surface portion of said metal frame which will be engaged by said sealing section.

8. A method according to claim 7, wherein said step of providing said frame includes the step of selecting an ASTM F15 steel material for use as said frame.

9. A method according to claim 7, wherein said oxidizing step includes the step of placing said frame in a wet nitrogen furnace while heating said frame.

10. A method according to claim 9, wherein said step of heating said frame within said furnace is carried out by heating said frame to a peak temperature in the range of approximately 975° C. to 1005° C. for a time period in the range of approximately 9 to 13 minutes.

11. A method according to claim 9, including prior to said oxidizing step the step of placing said frame in a wet hydrogen furnace while heating said frame.

12. A method according to claim 11, wherein said step of heating said frame within said wet hydrogen furnace is carried out by heating said frame to a peak temperature of approximately 1050° C. for a time period in the range of approximately 11 to 15 minutes.

* * * * *

UNITED STATES PATENT AND TRADEMARK OFFICE
CERTIFICATE OF CORRECTION

PATENT NO. : 6,974,517 B2 Page 1 of 1
APPLICATION NO. : 09/880365
DATED : December 13, 2005
INVENTOR(S) : Mark B. Hanna It is certified that error appears in the above-identified patent and that said Letters Patent is hereby corrected as shown below:

Column 12, Line 37:
After "with said wet" delete "hydrogen" and insert -- nitrogen --.

Signed and Sealed this

Sixth Day of November, 2007

JON W. DUDAS
*Director of the United States Patent and Trademark Office*